US010184823B2

(12) United States Patent
Debus et al.

(10) Patent No.: US 10,184,823 B2
(45) Date of Patent: Jan. 22, 2019

(54) SUB-QUANTITY SCALE HAVING AN AIR NOZZLE ALONG A CONVEYING CHANNEL, AND A METHOD OF OPERATING A SUB-QUANTITY SCALE

(71) Applicant: MULTIWEIGH GMBH, Wetzlar (DE)

(72) Inventors: Heinz Debus, Asslar (DE); Frank Schmehl, Asslar (DE)

(73) Assignee: MUTLIWEIGH GMBH, Wetzlar (DE)

( * ) Notice: Subject to any disclaimer, the term of this patent is extended or adjusted under 35 U.S.C. 154(b) by 79 days.

(21) Appl. No.: 15/023,243

(22) PCT Filed: Sep. 8, 2014

(86) PCT No.: PCT/EP2014/069107
§ 371 (c)(1),
(2) Date: Mar. 18, 2016

(87) PCT Pub. No.: WO2015/039916
PCT Pub. Date: Mar. 26, 2015

(65) Prior Publication Data
US 2016/0231164 A1 Aug. 11, 2016

(30) Foreign Application Priority Data

Sep. 23, 2013 (EP) .................................. 13185603

(51) Int. Cl.
*B65G 45/22* (2006.01)
*G01G 19/393* (2006.01)
(Continued)

(52) U.S. Cl.
CPC .............. *G01G 13/00* (2013.01); *B08B 5/02* (2013.01); *B65G 45/22* (2013.01); *G01G 13/003* (2013.01);
(Continued)

(58) Field of Classification Search
CPC ...... G01G 13/00; G01G 13/003; G01G 13/06; G01G 13/028; G01G 13/16; G01G 19/387;
(Continued)

(56) References Cited

U.S. PATENT DOCUMENTS 3,642,128 A * 2/1972 Westwood ................ B07C 5/20
177/50
3,980,180 A * 9/1976 Jamieson .............. B07C 5/3416
209/565

(Continued)

FOREIGN PATENT DOCUMENTS

GB 2003284 A 3/1979
GB 2137969 A 10/1984
(Continued)

OTHER PUBLICATIONS

International Search Report and Written Opinion dated Nov. 18, 2014 for International Application No. PCT/EP2014/069107, filed Sep. 8, 2014.

(Continued)

Primary Examiner — Randy Gibson
(74) Attorney, Agent, or Firm — David D. Brush; Westman, Champlin & Koehler, P.A.

(57) ABSTRACT

A sub-quantity scale and method for transferring a sub-quantity are provided. The scale includes a product feeding device, a product distributing device and a plurality of sub-quantity storage containers for transferring the sub-quantities to a weighing device, from which the sub-quantities pass into a packaging container. The product is fed into the sub-quantity storage containers by using vibration conveyor devices, each of which has a conveying channel and is assigned to one of the sub-quantity storage containers. A nozzle device subjects a conveying surface of the conveying channel to an air flow oriented in the conveying direction.

(Continued)

The nozzle device is arranged in a transfer area between the product distributing device and the conveying channel.

13 Claims, 3 Drawing Sheets

(51) Int. Cl.
*B08B 5/02* (2006.01)
*G01G 13/00* (2006.01)
*G01G 13/02* (2006.01)
*G01G 17/02* (2006.01)
*B65G 45/10* (2006.01)
*B08B 9/08* (2006.01)

(52) U.S. Cl.
CPC ........... *G01G 13/028* (2013.01); *G01G 17/02* (2013.01); *B08B 9/08* (2013.01); *B65G 45/10* (2013.01); *G01G 19/393* (2013.01)

(58) Field of Classification Search
CPC ........ G01G 19/393; G01G 17/02; B08B 5/02; B08B 9/08; B65G 29/00; B65G 45/00; B65G 45/10; B65G 45/22
USPC .................................................. 177/119, 145
See application file for complete search history.

(56) References Cited

U.S. PATENT DOCUMENTS

| | | | | | |
|---|---|---|---|---|---|
| 4,306,629 | A | * | 12/1981 | Powell | G01G 5/006 177/1 |
| 4,566,549 | A | * | 1/1986 | Oshima | B08B 5/02 15/301 |
| 4,570,831 | A | * | 2/1986 | Izumi | B65G 47/19 198/756 |
| 4,591,012 | A | * | 5/1986 | Moran | G01G 13/16 177/145 |
| 4,657,144 | A | * | 4/1987 | Martin | A24B 1/04 131/108 |
| 4,732,513 | A | * | 3/1988 | Lenhart | B65G 51/03 406/88 |
| 4,828,434 | A | * | 5/1989 | Fairman | B65G 51/03 406/87 |
| 4,941,565 | A | * | 7/1990 | Hirota | B65G 47/19 177/25.18 |
| 5,322,152 | A | * | 6/1994 | Tommila | B07C 5/122 194/212 |
| 5,340,949 | A | * | 8/1994 | Fujimura | G01G 17/04 177/25.18 |
| 5,634,636 | A | * | 6/1997 | Jackson | B65H 5/228 271/184 |
| 6,630,633 | B1 | * | 10/2003 | Uber | G01G 5/006 177/145 |
| 6,689,961 | B2 | * | 2/2004 | Matsuyama | G01G 19/393 141/286 |
| 8,360,270 | B1 | * | 1/2013 | McClosky | G07F 11/44 177/116 |
| 8,821,078 | B2 | * | 9/2014 | Hockett | B65G 47/684 111/175 |
| 2016/0161135 | A1 | * | 6/2016 | Kikuchi | G01G 19/393 177/245 |

FOREIGN PATENT DOCUMENTS

| | | |
|---|---|---|
| JP | S57192831 A | 11/1982 |
| RU | 2399889 C1 | 9/2010 |
| RU | 121235 U1 | 10/2012 |
| SU | 781152 A1 | 11/1980 |

OTHER PUBLICATIONS

English Translation of the International Search Report and Written Opinion dated Nov. 18, 2014 for International Application No. PCT/EP2014/069107, filed Sep. 8, 2014.

European Search Report dated Feb. 13, 2014 for European Application No. 13185603.1 filed Sep. 23, 2013.

"Dataweigh Fresh Food and Salad", Yamato Scale, Apr. 21, 2011, XP002718490, Retrieved from the Internet: URL: http://www.poscosecha.com/download/product/10637/10582/1505633799/757152/cms/yamato+fresh+produce_b0237en01a00.pdf/ [retrieved on Jan. 9, 2014] the whole document.

Yamato Scale: "Yamato Dataweigh Omega weighing Salad", Yamato, Dec. 11, 2012, XP002718469, Retrieved from the Internet : https://www.youtube.com/watch?v=6dis0j8HAaw [retrieved on Jan. 9, 2014], the whole document.

English translation of the Russian Office Action dated May 15, 2018 for corresponding Russian Patent Application No. 2016112970/28(020389).

* cited by examiner

SUB-QUANTITY SCALE HAVING AN AIR NOZZLE ALONG A CONVEYING CHANNEL, AND A METHOD OF OPERATING A SUB-QUANTITY SCALE

CROSS-REFERENCE TO RELATED APPLICATIONS

This Application is a Section 371 National Stage Application of International Application No. PCT/EP2014/069107, filed Sep. 8, 2014, the content of which is incorporated herein by reference in its entirety, and published as WO 2015/039916 on Mar. 26, 2015, not in English.

FIELD OF THE DISCLOSURE

The present invention relates to a sub-quantity scale comprising a product feeding device, a product distributing device and a plurality of sub-quantity storage containers for transferring the sub-quantities to a weighing device, from which the sub-quantities pass into a packaging container, the product being fed into the sub-quantity storage containers by means of vibration conveyor devices, each of which has a conveying channel and is assigned to one of the sub-quantity storage containers. Furthermore, the invention relates to a method for transferring a sub-quantity of a product fed to a product distributing device by means of a product feeding device to a sub-quantity storage container, which serves to transfer the sub-quantities to a weighing device, from which the sub-quantities pass into a packaging container, wherein the product is fed into the sub-quantity storage containers by means of vibration conveyor devices, each of which has a conveying channel and is assigned to one of the sub-quantity storage containers.

BACKGROUND OF THE DISCLOSURE

Sub-quantity scales of the kind mentioned above are used to produce packaging or sale units of various products. In general, the principle of sub-quantity scales is that a continuously fed product stream is divided into sub-quantities and fed to a plurality of sub-quantity storage containers, then a weight of the sub-quantities is determined and finally a combination of multiple sub-quantities is selected to be filled into a packaging container in such a manner that the sub-quantity product weights add up to the desired packaging weight of the product.

The sub-quantity storage containers are filled by means of vibration conveyor devices, each of which has a conveying channel and is assigned to one of the sub-quantity storage containers. In particular when filling leaf salads it has been found that because of the high moisture content of the salad leaves, which pass from the product distributing device onto a conveying surface of the conveying channel, the salad leaves adhere to the conveying surface in an undesired manner in spite of the application of vibrations to the conveying channel, which means that an undisturbed vibration conveying of the leaf salads usually requires a drying process to precede the vibration conveying in order to arrive at a residual moisture that allows smooth vibration conveying in the conveying channel.

On the one hand, this leads to increased costs due to the additional drying process when packaging leaf salads, and on the other hand, the weight must often be reduced even to below admissible drained net weights of the filled product in order to allow a smooth packaging process. While this is to the benefit of the consumer, it constitutes a loss for the producer.

SUMMARY

In the sub-quantity scale according to the invention, a nozzle device for subjecting a conveying surface of the conveying channel to an air flow oriented in the conveying direction is arranged in a transfer area between the product distributing device and the conveying channel.

Thus, it is possible to superimpose a directed air flow on the the application of vibrations to the conveying channel, supporting the conveying effect of the application of vibrations to the conveying channel. Moreover, the conveyor device can be operated with a reduced oscillation amplitude. Simultaneously to the advancing impulse due to the application of the flow, the application of the flow causes an at least slight reduction of the moisture content of the products conveyed in the conveying channel without a drying process preceding the feeding of the product being necessary.

Preferably, the nozzle device is arranged below a transfer edge of the product distributing device and is recessed against the conveying direction of the conveying channel with respect to the transfer edge so that, on the one hand, the conveying path of the product sub-quantity conveyed from the product distributing device into the conveying channel is unaffected and, on the other hand, it becomes possible to subject the product to an air flow as soon as during the free fall from the product distributing device into the conveying channel. Thus, the product can be subjected to the air flow in a particularly effective manner.

If the nozzle device is arranged at a placement end of the conveying channel below a roof-like projection of the product distributing device, said projection overlapping the placement end and being limited by the transfer edge, the nozzle device is located in a protected area so that a direct impact of the product on the nozzle device and with it a potential effect on the free nozzle flow is prevented.

It is particularly preferred if the nozzle device is designed in such a manner that the conveying surface is subjected to the air flow in such a manner that an air cushion is formed on the conveying surface of the conveying channel so that the duration of the contact of the product with the conveying surface during vibration conveying is at least reduced and a supporting air layer is formed between the product, i.e. the salad leaves, for example, and the conveying surface.

If the nozzle device is designed in such a manner that the air flow has a substantially rectangular flow cross-section, the afore-described advantageous effect is even more pronounced.

Preferably, the nozzle device comprises at least one nozzle having a rectangular nozzle slot. In particular if the nozzle device comprises a plurality of nozzles arranged in a row parallel to the conveying surface, the nozzles of the nozzle device can also have a round nozzle cross-section so that in this case, too, an approximately rectangular flow cross-section on the conveying surface is made possible by superimposition of the individual nozzle flows.

According to another solution to the underlying problem, a nozzle device for a sub-quantity scale according to one or more of claims 1 to 7 is proposed, the nozzle device forming a modular unit together with the conveying channel so that it is also possible to form a sub-quantity scale according to the invention by exchanging one or more conveying channels against a nozzle device that forms a modular unit together with the conveying channel.

According to another solution to the underlying problem, a method for transferring a sub-quantity fed to a product distributing device by means of a product feeding device to a sub-quantity storage container is provided according to claim 9.

According to the invention, a conveying surface of the conveying channel is subjected to an air flow oriented in the conveying direction by means of a nozzle device in a transfer area between the product distributing device and the conveying channel.

Preferably, the air flow is applied in such a manner that an air cushion is formed on the conveying surface.

It is particularly preferred if the air flow is applied in such a manner that the air flow is formed parallel to the conveying surface.

Optionally, the air flow can be applied to the conveying surface in a discontinuous or continuous manner, wherein it is particularly preferred if the air flow is applied to the conveying surface as a function of process parameters of the operation of the sub-quantity scale.

It is particularly advantageous if the air flow is applied to the conveying surface while at the same time the conveying channel is subjected to vibrations.

In the following description, a preferred embodiment of the sub-quantity scale and a nozzle device being employed in the sub-quantity scale and the method for operating the sub-quantity scale provided with the nozzle device will be explained in detail with reference to the drawing.

BRIEF DESCRIPTION OF ILLUSTRATIVE EMBODIMENTS

Figure 1:
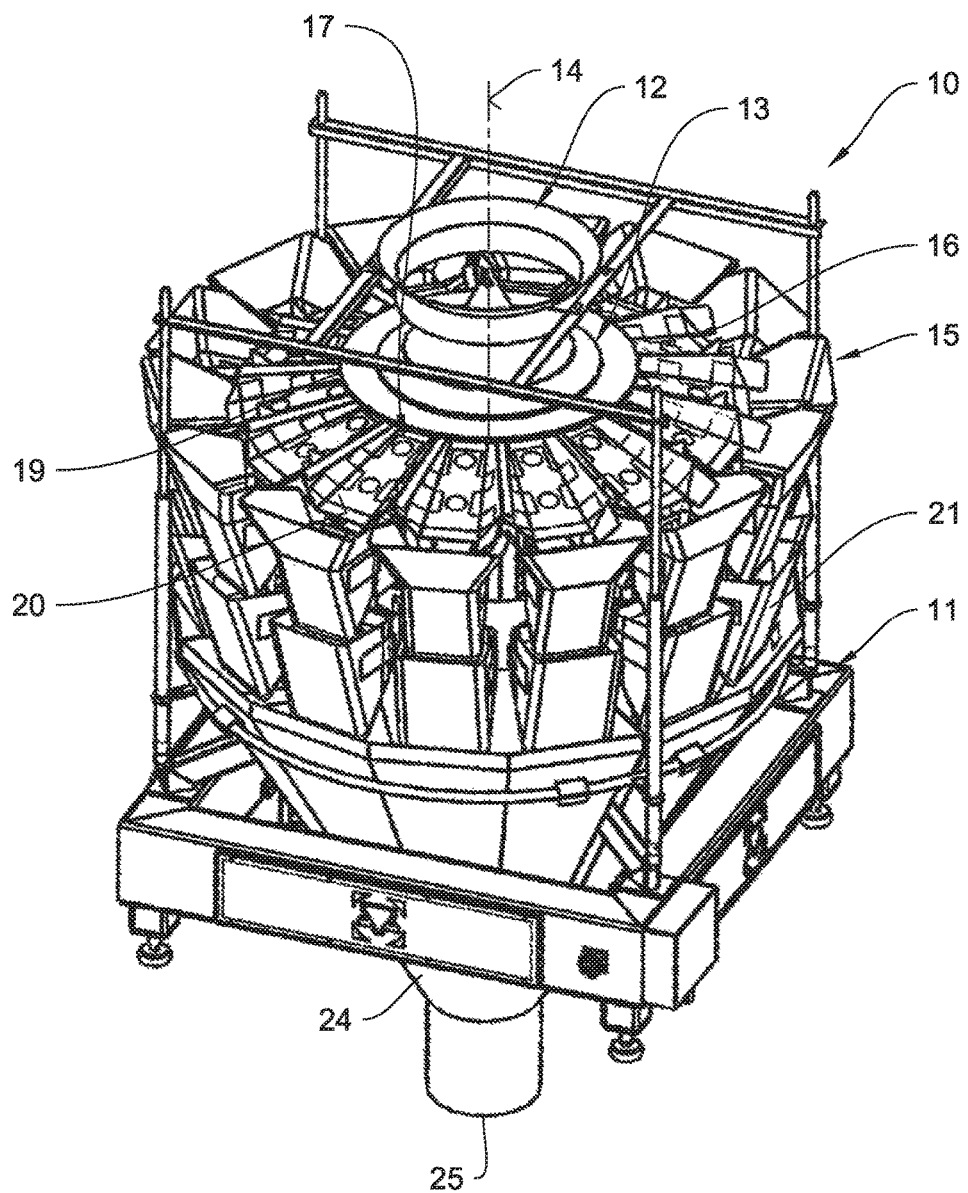
FIG. 1 shows a sub-quantity scale in an isometric illustration.

FIG. 1 shows a sub-quantity scale 10 arranged on a support structure 11 and comprising a product feeding device 12 formed by a feeding funnel in this case, a product distributing device 13 realized in this case by a rotating distributor disk below the product feeding device 12, and a plurality of sub-quantity storage containers 15 arranged concentrically about an axis of rotation 14 of the product distributing device 13 in the illustrated embodiment example. Conveying channels 16 are arranged between the product distributing device 13 and the sub-quantity storage containers 15, placement ends 17 of said conveying channels 16 for receiving products 18 arranged on the product distributing device 13 (FIG. 3) being arranged below a transfer edge 19 of the product distributing device 13, and discharge ends 20 of said conveying channels 16 being arranged above the assigned sub-quantity storage containers 15.

In the example of the sub-quantity scale 10 illustrated in FIG. 1, an intermediate storage device 21 is located below each of the sub quantity storage containers 15, said intermediate storage device 21 being provided with a controllable bottom hatch 22 and 23 in the same way as the sub-quantity storage containers 15 arranged above the intermediate storage device 21. The bottom hatches 23 of the intermediate storage devices 21 are arranged above a reservoir device 24, which is realized in the shape of a funnel in this case and has a product discharge device 25 at its lower end.

When the sub-quantity scale 10 is in operation, the product to be distributed to the sub-quantity storage containers 15 continuously passes through the product feeding device 12 onto the product distributing device 13. The product, which is salad leaves in the case at hand, is distributed to the conveying channels 16 by the rotating product distributing device 13 and is conveyed into the sub-quantity storage containers 15 by the conveying channels 16, which are subjected to oscillations. From the sub-quantity storage containers 15, the product sub-quantities are passed through the opening of the bottom hatch 22 to the intermediate storage devices 21 arranged below, which are provided with weighing devices (not illustrated) for determining the product sub-quantities contained in the intermediate storage devices 21.

As a consequence of the product sub-quantities conveyed into the respective sub-quantity storage containers 15 and not being exactly defined in terms of their amount, the intermediate storage device 21 contain different product sub-quantities after receiving the product sub-quantities from the sub-quantity storage containers 15. To fill a packaging container 26 arranged below the product discharge device 25, a combination of intermediate storage devices 21 is now opened by operating their bottom hatches 23 in such a manner that the sum of the combination of product sub-quantities corresponds to the desired product weight or the desired filling amount of the product filled into the packaging container 26.

As becomes apparent from a combined view of FIGS. 1 and 2, a nozzle device 27 is provided at an axial end of each of the conveying channels 16 in the area of the placement end 17, said nozzle device 27 being arranged below a roof-like projection 28 of the product distributing device 13, which is limited by the transfer edge 19.

Figure 3:
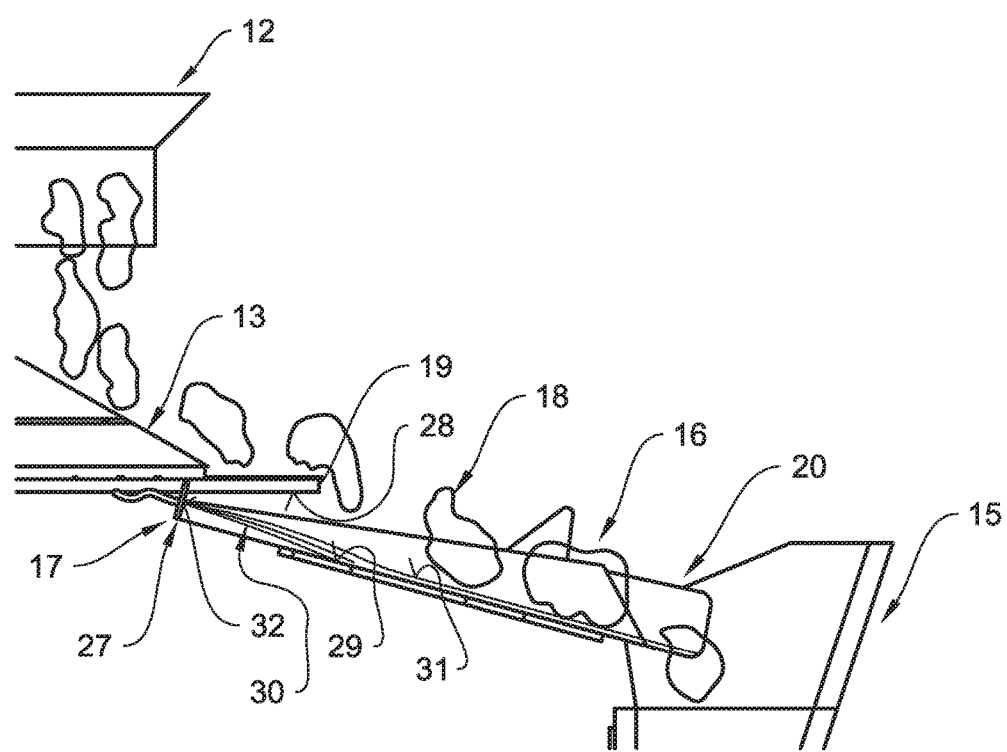
FIG. 3 shows an enlarged partial view of the sub-quantity scale of FIG. 2.

As is shown in particular in FIG. 3, the nozzle device 27 is designed and arranged in such a manner that a conveying surface 29 of the conveying channel 16 is subjected to an air flow 30 in such a manner that an air cushion 31 forms on the conveying surface 29.

In the case at hand, the nozzle device 27 comprises a nozzle 32 that has a nozzle slot (not illustrated) oriented parallel to the conveying surface 29 and forming a substantially fan-shaped air flow in the exit area of the nozzle 32, said fan-shaped air flow, in cooperation with side edges of the conveying channel 16 forming flow guide elements, allowing a substantially rectangular flow cross-section to form at a sufficient distance from the nozzle 32.

As in particular FIG. 3 further shows, the nozzle device 27 is arranged directly at the placement end 17 of the conveying channel 16 so that the nozzle device 27 forms a modular unit together with the conveying channel 16 and, as such a modular unit, can be exchanged against a conveying channel of a conventional sub-quantity scale, which consequently does not have a nozzle device, or the sub-quantity scale can be retrofitted with said modular unit, for example.

Figure 2:
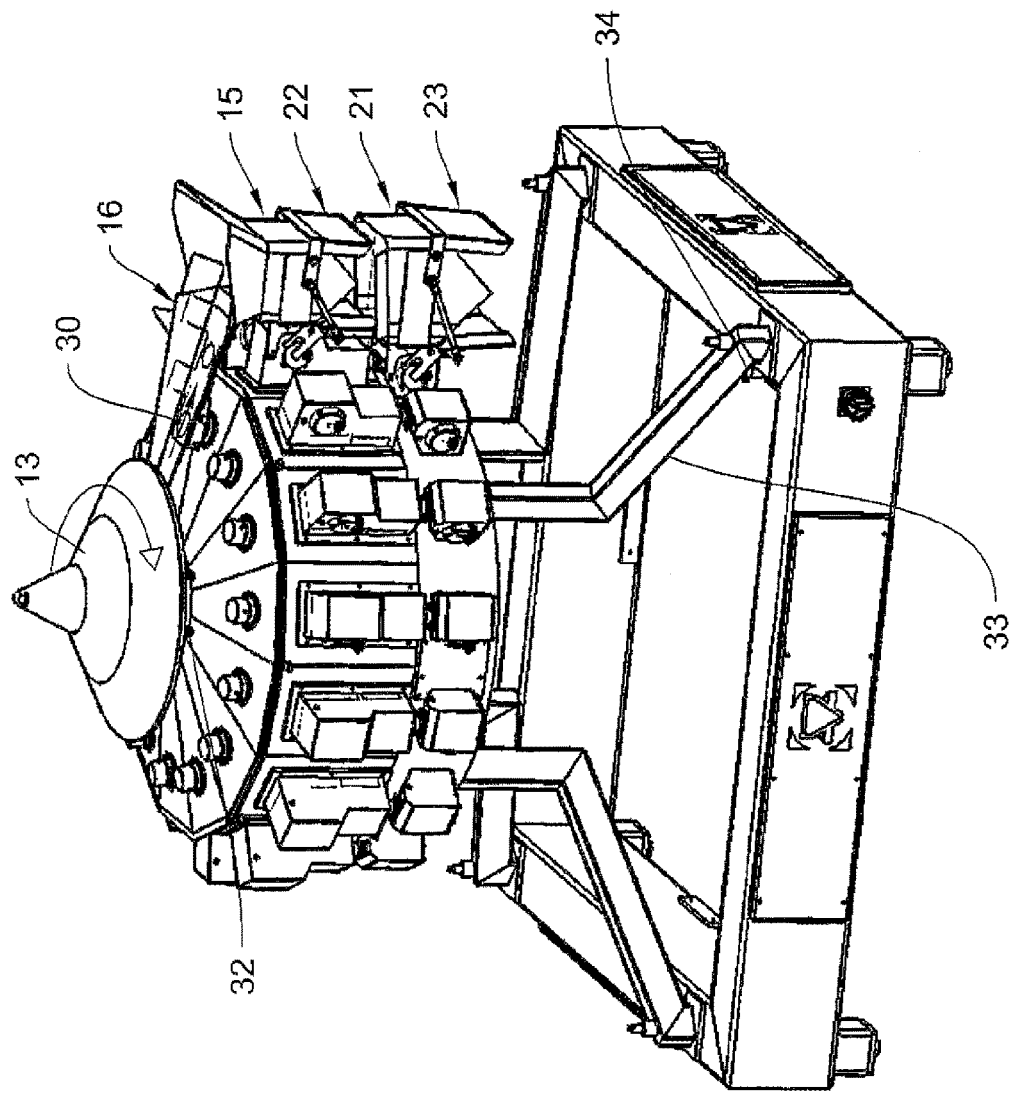
FIG. 2 shows the sub-quantity scale of FIG. 1 in a partially disassembled state, including the illustration of a conveying path of a product sub-quantity fed to a sub-quantity storage container by a product distributing device by way of conveying channel.

FIG. 2 shows that the nozzle device 27 is connected to an air filter unit 34 via a pressure line 33, said air filter unit 34 permitting the air hitting the product 18, e.g. the salad leaves, via the nozzle device 27 to be cleaned so as to allow the sub-quantity scale 10 to also be operated under hygienically demanding conditions. Moreover, it is also possible to use the nozzle device 27 to subject the product 18 to gases or aerosols that make it possible to influence the quality of the product.

An exemplary embodiment of the present application allows products, in particular leaf salads, to be filled even in case of a comparatively high moisture content.

Although the present disclosure has been described with reference to one or more examples, workers skilled in the art will recognize that changes may be made in form and detail without departing from the scope of the disclosure and/or the appended claims.

The invention claimed is:

1. A sub-quantity scale comprising:
   a product feeding device,
   a product distributing device, and
   a plurality of sub-quantity storage containers for transferring sub-quantities of a product to a weighing device, from which the sub-quantities pass into a packaging container,
   vibration conveyor devices, between the product distributing device and the plurality of sub-quantity containers, which feed the product into the sub-quantity storage containers, each of which having a conveying channel and a conveying direction and being assigned to one of the sub-quantity storage containers, and
   a nozzle device for subjecting a conveying surface of the conveying channel to an air flow oriented in the conveying direction, wherein the nozzle device is arranged in a transfer area between the product distributing device and the conveying channel, wherein the nozzle device is arranged below a transfer edge of the product distributing device and is recessed against the conveying direction of the conveying channel with respect to the transfer edge, in order to subject the product to the air flow during free fall from the product distributing device into the conveying channel.

2. The sub-quantity scale according to claim 1, wherein the nozzle device is arranged at a placement end of the conveying channel below a projection of the product distributing device, said projection overlapping the placement end and being limited by the transfer edge.

3. The sub-quantity scale according to claim 1, wherein the nozzle device is designed in such a manner that the conveying surface is subjected to the air flow in such a manner that an air cushion is formed on the conveying surface.

4. The sub-quantity scale according to claim 3, wherein the nozzle device is designed in such a manner that the air flow has a substantially rectangular flow cross-section.

5. The sub-quantity scale according to claim 4, wherein the nozzle device comprises at least one nozzle having a rectangular nozzle slot.

6. The sub-quantity scale according to claim 4, wherein the nozzle device comprises a plurality of nozzles arranged in a row and parallel to the conveying surface of the conveying channel.

7. A nozzle device for a sub-quantity scale according to claim 1, wherein the nozzle device forms a modular unit together with the conveying channel.

8. A method comprising:
   transferring a sub-quantity of a product fed to a product distributing device by a product feeding device to a sub-quantity storage container, which serves to transfer the sub-quantities to a weighing device, from which the sub-quantities pass into a packaging container, wherein transferring comprises:
   feeding the product into the sub-quantity storage containers by vibration conveyor devices, each of which has a conveying channel and a conveying direction and being assigned to one of the sub-quantity storage containers, and
   in a transfer area between the product distributing device and the conveying channel, subjecting a conveying surface of the conveying channel to an air flow oriented in the conveying direction by a nozzle device, which is arranged below a transfer edge of the product distributing device and is recessed against the conveying direction of the conveying channel with respect to the transfer edge, in order to subject the product to the air flow during free fall from the product distributing device into the conveying channel.

9. The method according to claim 8, wherein the air flow is applied in such a manner that an air cushion is formed on the conveying surface of the conveying channel.

10. The method according to claim 8, wherein the air flow is applied in such a manner that the air flow is formed parallel to the conveying surface of the conveying channel.

11. The method according to claim 8, wherein the air flow is applied to the conveying surface in a discontinuous manner.

12. The method according to claim 8, wherein the air flow is applied to the conveying surface as a function of process parameters of the operation of the sub-quantity scale.

13. The method according to claim 12, comprising applying the air flow while at the same time subjecting the conveying channel to vibrations.

* * * * *